3,021,330
**METHOD FOR PURIFYING 2,5-DIMETHYL-
PIPERAZINE**
George W. Fowler and Donald G. Crosby, South Charleston, and William R. Proops, Charleston, W. Va., assignors to Union Carbide Corporation, a corporation of New York
No Drawing. Filed July 28, 1959, Ser. No. 829,963
6 Claims. (Cl. 260—250)

This invention is concerned with a method of refining 2,5-dimethylpyrazine to remove relatively small amounts of monoisopropanolamine therefrom. The present application is a continuation-in-part of our pending application Serial No. 564,359 filed February 9, 1956, now Patent No. 2,920,076.

In our parent application Serial No. 564,359 there is disclosed a method of making trans 2,5-dimethylpiperazine which involves the hydrogenation of 2,5-dimethylpyrazine. In accordance with one embodiment of the disclosed method a gaseous phase mixture of 2,5-dimethylpyrazine and hydrogen is passed over a nickel catalyst at a temperature of 150°–180° C. to form a mixture of the cis and trans isomers of 2,5-dimethylpiperazine, which are subsequently separated from one another. The 2,5-dimethylpyrazine used as a starting material in this process may be conveniently prepared by the dehydrogenation, condensation and cyclodehydration of monoisopropanolamine according to the method described in the copending application of Benjamine T. Freure, Serial No. 514,-123 filed June 8, 1955. However, it has been found that 2,5-dimethylpyrazine as thus prepared contains a certain amount of unreacted monoisopropanolamine which cannot be readily separated from the dimethylpyrazine by distillation and which has a strong tendency to impair the activity of the nickel catalyst used in hydrogenation of the 2,5-dimethylpyrazine to the corresponding piperazine. Our work indicates that as little as one-half of one percent of monoisopropanolamine in the 2,5-dimethylpyrazine used as a feed to the catalyst bed significantly impairs the catalyst activity. Hence it is important that the 2,5-dimethylpyrazine used as a starting material in the process of our parent application be subjected to a careful preliminary purification.

It is known that monoisopropanolamine can be separated from mixtures thereof with 2,5-dimethylpiperazine by azeotropic distillation with certain liquid hydrocarbons. The volatile liquid hydrocarbon is added to the 2,5-dimethylpiperazine containing the monoisopropanolamine, and the mixture is heated to cause an azeotrope of the hydrocarbon and monoisopropanolamine to distill therefrom. In this way a certain amount of removal of monoisopropanolamine from the 2,5-dimethylpiperazine can be achieved. However, when an effort is made to apply this process to the purification of 2,5-dimethylpyrazine for use in the process of our parent application, it is found that sufficient removal of the monoisopropanolamine cannot be achieved in this fashion. Monoisopropanolamine is soluble to some extent in the volatile hydrocarbon. Hence when the azeotropic distillation has been carried to a certain point, an equilibrium is achieved and no further separation of the monoisopropanolamine is possible. About 4 to 10% of monoisopropanolamine remains in the mixture after this equilibrium has been reached and this amount is sufficient to produce substantial impairment of catalyst activity in the process of our parent application.

It is accordingly an object of the present invention to provide an improved method of purifying 2,5-dimethylpyrazine. It is another object of the invention to provide a method of purifying 2,5-dimethylpyrazine containing small amounts of monoisopropanolamine that is sufficiently effective to reduce the monoisopropanolamine content of the 2,5-dimethylpyrazine to a small fraction of one percent. Other objects of the invention will be in part obvious and in part pointed out hereafter.

The objects of the invention are achieved in general by utilizing a modified azeotropic distillation procedure wherein the distillate is continuously washed with water. The 2,5-dimethylpyrazine containing a minor quantity of monoisopropanolamine is mixed with a volatile liquid hydrocarbon and the mixture heated to vaporize an azeotrope essentially composed of the liquid hydrocarbon and the monoisopropanolamine. The vapor mixture is removed at the top of the distillation column, condensed, and thoroughly washed with water. Since monoisopropanolamine is substantially more soluble in water than in the hydrocarbon, most of the monoisopropanolamine is separated from the hydrocarbon in this washing step. The liquid hydrocarbon is separated from the resulting monoisopropanolamine solution by decantation and returned to the still.

The washed hydrocarbon is preferably returned to the top of the still column as reflux, although if desired it may also be returned to the still kettle. In either event, the continuous water-washing of the distillate results in a separation of the monoisopropanolamine from the 2,5-dimethylpyrazine that is both more rapid and more complete than the separation achieved when previously proposed procedures are employed.

Washing of the distillate may be carried out in any of various ways so long as good contact between the distillate and wash-water is achieved. In accordance with one method that has been found satisfactory, the condensed distillate is fed to the bottom of a scrubber containing a predetermined amount of water, and the washed hydrocarbon, which collects at the top of the body of water in the scrubber, is removed and returned to the still system. When using this procedure the scrubber is desirably charged with a predetermined weight of water and the water in the scrubber is changed from time to time. The extent of removal of monoisopropanolamine can be determined by determining the increase in weight of the aqueous layer in the scrubber. When the weight of this aqueous layer becomes constant, removal of the monoisopropanolamine may be considered substantially complete. It has been found that by this procedure the monoisopropanolamine content of the 2,5-dimethylpyrazine can be reduced to less than 0.1%, at which concentration it has little if any deleterious effect on the nickel catalyst used in the process of our parent application.

Many different types of liquid hydrocarbons can be used in carrying out the present refining method. The hydrocarbons that are useful ordinarily have boiling points between 100° and 200° C. and may include ethylbenzene, diethylbenzene, isopropylbenzene, naphtha, toluene, the xylenes, straight-chain and branched-chain octanes and nonanes, and substituted cyclohexanes, e.g. 1,2-dimethylcyclohexane. In order to facilitate separation of the hydrocarbon and 2,5-dimethylpyrazine after the monoisopropanolamine has been removed, it is preferable to employ a hydrocarbon boiling at 110° to 135° C., that is, well below the boiling point of the dimethylpyrazine. Such hydrocarbons may be VMP naphtha, n-octane or 1,2-dimethylcyclohexane.

Upon completion of the washing step the liquid hydrocarbon is separated from the 2,5-dimethylpyrazine by distillation. If the nature of the liquid hydrocarbon used is such that its boiling point is substantially different from that of the dimethylpyrazine, this separation can be effected by simple fractional distillation. However, if the boiling points of the liquid hydrocarbon and dimethylpyrazine are relatively close together, it is desirable to add to the mixture a quantity of water sufficient to permit removal of the hydrocarbon as a water-hydrocarbon azeotrope. Upon condensation of this azeotrope, the hydrocarbon separates as an upper layer which is removed from the system and the water layer is returned to the still. After disappearance of the hydrocarbon layer, the water present in the system can be removed from the 2,5-dimethylpyrazine by distillation. If the hydrocarbon used has a boiling point within the preferred range of 110° to 135° C., addition of water to form a hydrocarbon-water azeotrope is unnecessary.

In order to point out more fully the nature of the present invention, the following example is given of an illustrative procedure that may be used in carrying out the method of the invention:

A quantity of 2,5-dimethylpyrazine prepared according to the process of application Serial No. 514,123 referred to above and containing about 10% monoisopropanolamine was mixed with about 20% of its weight of VMP naphtha having a boiling range of 110° to 120° C. and distilled in a reflux still. The condensed distillate was passed upwardly through a scrubber containing a predetermined quantity of water to dissolve monoisopropanolamine from the distillate, and the naphtha, which collected at the top of the scrubber, was returned to the still. The wash water was replaced by fresh water from time to time and the removed water was weighted to determine its monoisopropanolamine content. Distillation was continued until the increase in weight of the water removed was negligible, i.e., less than 1%. Thereafter the naphtha and 2,5-dimethylpyrazine were separated by fractional distillation. The resulting 2,5-dimethylpyrazine was found to contain less than 0.1% of monoisopropanolamine. Moreover when the thus purified 2,5-dimethylpyrazine was hydrogenated in accordance with the procedure of our parent application, Serial No. 564,359, it was found that the monoisopropanolamine content had been reduced to a level such that it exerted no significant deleterious effect upon the catalyst.

It is of course to be understood that the foregoing procedure is illustrative only and that any of the volatile liquid hydrocarbons mentioned in the introductory portion of the present specification can be substituted for the naphtha referred to in the specific procedure. Also changes in the proportions and conditions illustratively described can be made without departing from the spirit of the invention as set forth in the appended claims.

We claim:
1. The method of refining 2,5-dimethylpyrazine containing a small quantity of monoisopropanolamine which comprises distilling under reflux a mixture of said dimethylpyrazine and a volatile liquid hydrocarbon having a boiling point between 100° and 200° C., washing the distillate with water to remove monoisopropanolamine therefrom, returning the washed distillate as reflux to the hydrocarbon-dimethylpyrazine mixture, continuing the distillation of said mixture until substantially all of said monoisopropanolamine has been transferred to the wash water, and separating said hydrocarbon from said dimethylpyrazine by distillation.

2. The method of refining 2,5-dimethylpyrazine containing a small quantity of monoisopropanolamine which comprises distilling under reflux a mixture of a volatile liquid hydrocarbon having a boiling point of 100° C. to 200° C. and said dimethylpyrazine, washing the distillate with water to remove monoisopropanolamine therefrom, returning the washed distillate to the hydrocarbon-dimethylpyrazine mixture, continuing the distillation of said mixture until substantially all of said monoisopropanolamine has been transferred to the wash water, adding a quantity of water to said hydrocarbon-dimethylpyrazine mixture, distilling said hydrocarbon from said mixture as a water-hydrocarbon azeotrope, then distilling water from said mixture as a water-dimethylpyrazine azeotrope and thereafter distilling said dimethylpyrazine to obtain a product substantially free from monoisopropanolamine.

3. A method according to claim 1 and wherein said liquid hydrocarbon has a boiling point between 110° and 135° C.

4. A method according to claim 3 and wherein said liquid hydrocarbon is a naphtha boiling in the range 110° to 120°.

5. A method according to claim 3 and wherein said liquid hydrocarbon is an octane.

6. A method according to claim 3 and wherein said liquid hydrocarbon is a dimethylcyclohexane.

References Cited in the file of this patent
UNITED STATES PATENTS
2,813,869    Langdon et al. _____ Nov. 19, 1957

OTHER REFERENCES

Weissberger: Technique of Organic Chemistry, vol. IV, pages 366–367 and 378–380 (1951).

UNITED STATES PATENT OFFICE
CERTIFICATE OF CORRECTION

Patent No. 3,021,330                  February 13, 1962

George W. Fowler et al.

It is hereby certified that error appears in the above numbered patent requiring correction and that the said Letters Patent should read as corrected below.

In the heading to the printed specification, line 3, for "PIPERAZINE" read -- PYRAZINE --; column 3, line 28, for "weighted" read -- weighed --.

Signed and sealed this 2nd day of October 1962.

(SEAL)
Attest:

ERNEST W. SWIDER
Attesting Officer

DAVID L. LADD
Commissioner of Patents